United States Patent [19]

Baldino et al.

[11] 3,989,653
[45] Nov. 2, 1976

[54] DIESTERS OF TETRABROMOPHTHALIC ANHYDRIDE

[75] Inventors: James P. Baldino, Haddonfield, N.J.; Joseph Feltzin, Wilmington, Del.

[73] Assignee: ICI United States Inc., Wilmington, Del.

[22] Filed: May 23, 1975

[21] Appl. No.: 580,041

Related U.S. Application Data

[62] Division of Ser. No. 361,476, May 18, 1973, Pat. No. 3,929,866.

[52] U.S. Cl. .............................. 260/2.5 AJ; 252/8.1; 260/2.5 BB; 260/475 P
[51] Int. Cl.² ................. C07C 69/80; C08G 18/06; C09K 3/28
[58] Field of Search ....... 260/475 P, 2.5 BB, 2.5 AJ; 252/8.1

[56] References Cited
UNITED STATES PATENTS 3,285,995   11/1966   Nametz et al. ....................... 260/863
3,676,376   7/1972   Svoboda et al. ................. 260/2.5 AJ

OTHER PUBLICATIONS

Pape et al. — J. Cellular Plastics 4, Nov. 1968, pp. 438–442.

Pape et al. — An. SPI Conf. Tech. Papers 26, 695–698 (1968).

*Primary Examiner*—Lewis T. Jacobs
*Assistant Examiner*—H. H. Fletcher

[57] ABSTRACT

Diesters comprising the reaction product of tetrabromophthalic anhydride and a polyhydroxy compound containing at least 3 hydroxyl groups are disclosed. The diesters are prepared, in one step, by reacting tetrabromophthalic anhydride with the polyhydroxy compound at a temperature of from about 130° C. to about 190° C. in the presence of an alkaline material. The diesters are especially useful in the preparation of fire-retardant, self-extinguishing, polyurethane foams.

8 Claims, No Drawings

DIESTERS OF TETRABROMOPHTHALIC ANHYDRIDE

This is a division of application Ser. No. 361,476, filed May 18, 1973, now U.S. Pat. No. 3,929,866.

BACKGROUND OF THE INVENTION

1. Field of the Invention

The present invention relates generally to diesters of tetrabromophthalic anhydride, to a method of preparing said diesters, to polyurethane foam-forming compositions containing said diesters, and to fire-retardant, self-extinguishing, polyurethane foams prepared from said compositions. More particularly, the invention relates to diesters prepared by reacting tetrabromophthalic anhydride and a polyhydroxy compound containing at least 3 hydroxyl groups. The reaction is carried out in one step by heating the tetrabromophthalic anhydride and polyhydroxy compound in the presence of an alkaline material at a temperature of from about 130° C. to about 190° C. The resulting diesters of tetrabromophthalic anhydride may be combined with other polyols to form blends which are useful in foam-forming compositions comprising, in addition to the polyol blend, a catalyst, a surfactant, a suitable blowing agent, and an isocyanate. These compositions are especially useful in the preparation of polyurethane foams which are both fire-retardant and self-extinguishing.

2. Description of the Prior Art

Derivatives of tetrabromophthalic anhydride, including esters thereof, have been reported in the literature. The most commonly described materials are the half-esters or monoesters prepared by reacting one mol of a compound having hydroxyl, carboxyl, or sulfhydryl groups with one mol of the anhydride.

Several diesters have also been reported. These materials have been prepared by a two-step process which comprises, first, reacting the tetrabromophthalic anhydride with one of the compounds described above to prepare the half-ester and, subsequently, reacting the half-ester with an epoxide to form the diester. Diesters prepared in this manner are disclosed, for example, in the paper entitled "Tetrabromophthalic Anhydride in Flame-Retardant Polyurethane Foams" by Pape et al. in *An. SPI Tech. Conf. Tech. Papers*, Vol. 26, page 695, 1968; in U.S. Pat. No. 3,455,886 issued to Versnel; and in U.S. Pat. No. 3,585,185 issued to Levis et al.

Polymeric esters have also been prepared, often in a one-step procedure, employing tetrabromophthalic anhydride and hydroxyl-containing compounds. Such materials are disclosed, for example, in U.S. Pat. No. 3,285,995 issued to Nametz et al.

However, simple diesters of tetrabromophthalic anhydride have not previously been reported. As used herein, the term simple diesters refers to products prepared in one step by reacting tetrabromophthalic anhydride and a polyhydroxy compound.

Conventional polyurethane foams, while they have excellent insulating and shock absorbing properties, have been somewhat restricted in their usefulness due to the tendency of the foams to burn especially when exposed to a direct flame. Due to this tendency to burn, these materials have frequently been used only in applications where they are protected by another material which will act as a shield and prevent the exposure of the foam itself to an open flame. A variety of additives have previously been suggested for inclusion in polyurethane foams which would make these materials fire-retardant and/or self-extinguishing.

As used herein, the term "fire-retardant polyurethane foam" refers to a foam which will not burn or support combustion in air and which has an Oxygen Index, when measured in accordance with A.S.T.M. D-2863-70, of greater than 21. Said foams also have a flame-spread index equal to 25 or less when measured in accordance with the A.S.T.M. E-84 test. Also, as used herein, the term "self-extinguishing" refers to a foam which will only burn as long as a flame is directly impinged upon it. Removal of the flame results in extinguishment of the foam.

Tetrabromophthalic anhydride and derivatives thereof have been suggested for use in polyurethane foams. However, the previously available derivatives of tetrabromophthalic anhydride could not easily be employed in the preparation of polyurethane foams. Polymeric derivatives, because of their high molecular weights and low hydroxyl numbers, result in foams having a decreased cross-link density, poor humid aging properties, and only marginal improvements in the fire-retardant and self-extinguishing properties of the foam. These materials, as well as the half-esters, are often incompatible with other components, particularly the blowing agent, employed in the foam-forming compositions and, therefore, are of only limited utility. Also, the addition of half-esters often has a deleterious effect on the physical properties of the foams including the humid aging characteristics thereof.

In accordance with the present invention, simple diesters of tetrabromophthalic anhydride are prepared. The diesters have also been found to be useful in polyol blends which may be employed in the preparation of fire-retardant, self-extinguishing, polyurethane foams without adversely affecting the physical properties of said foams.

SUMMARY OF THE INVENTION

In accordance with the present invention, diesters of tetrabromophthalic anhydride are prepared comprising the reaction product of tetrabromophthalic anhydride and a polyhydroxy compound containing at least three hydroxyl groups. The diesters are prepared by reacting tetrabromophthalic anhydride and the polyhydroxy compound in the presence of an alkaline material at a temperature of from about 130° C. to about 190° C. The resulting diester has been found to be especially useful in polyol blends wherein it is combined with a condensate prepared by reacting a polyhydric alcohol and an alkylene oxide. These polyol blends, when combined with an isocyanate, a catalyst, a blowing agent, and a surfactant, result in compositions useful in the preparation of fire-retardant, self-extinguishing, polyurethane foams.

DESCRIPTION OF THE PREFERRED EMBODIMENTS

In accordance with the present invention, simple diesters of tetrabromophthalic anhydride are prepared by reacting a polyhydric alcohol with tetrabromophthalic anhydride. As mentioned above, any polyhydric alcohol which contains at least 3 hydroxyl groups and which does not decompose at the reaction temperatures employed may be utilized in preparing the diesters of the present invention. Representative polyhydric alcohols include both aliphatic and aromatic compounds such as, for example, trimethylol propane; pentaerythritol; glycerol; prodendro sorbitol — i.e., the reaction product of propylene oxide and sorbitol; arabitol; xylitol; adonitol; mannitol; dulcitol; sorbitol; 1,2,4-benzenetriol; phloroglucinol; 1,2,3,5-benzenetetrol; 1,2,4,5-benzenetetrol and benzenehexol. Of these, it is especially preferred to employ glycerol resulting in the preparation of the diglyceryl ester of tetrabromophthalic anhydride.

In preparing the diesters of the present invention, at least two mols of the polyhydric alcohol are combined with one mol of tetrabromophthalic anhydride and the resulting mixture is heated at a temperature in the range of from about 130° C. to about 190° C. In preparing diesters in accordance with the present invention, it has been found to be essential to employ this reaction temperature. At temperatures below about 130° C., very long reaction times are required; whereas, at temperatures above about 190° C., degradation and/or polymerization of the reactants occurs.

It has also been found to be essential to include in the reaction mixture an alkaline material in an amount sufficient to neutralize any residual acid present in the tetrabromophthalic anhydride. Any material an aqueous solution of which has a pH greater than about 8 may be employed. Representative materials include, for example, alkali metal and alkaline earth metal hydroxides; carbonates and bicarbonates, such as sodium hydroxide, sodium carbonate, sodium bicarbonate, potassium hydroxide, and calcium carbonate; ammonium hydroxide; and salts such as sodium acetate. Of these, preferred results have been achieved when sodium acetate is employed in the reaction mixture.

The reaction mixture is heated at the above-mentioned temperature until the acid number reaches less than one. As used herein, the term acid number refers to the number of milligrams of potassium hydroxide required to neutralize one gram of product. Completion of the reaction of the present invention is determined by periodically removing samples from the reaction mixture and titrating with base.

The diesters of the present invention have been found to be especially useful in polyol blends which may be employed in the preparation of self-extinguishing, fire-retardant, polyurethane foams.

In preparing the polyol blends, the diester is combined with a condensate prepared by reacting a polyhydric alcohol and an alkylene oxide. The polyhydric alcohols which may be utilized in the preparation of said condensate include any of those mentioned above as useful in the preparation of the diesters including, for example, sorbitol, glycerol, sucrose, $\alpha$-methyl glucosides, and pentaerythritol. The condensates are prepared by reacting the polyhydric alcohol with an alkylene oxide such as, for example, ethylene oxide, propylene oxide, or butylene oxide. The condensation reaction is carried out by methods which are well known in the art for preparing such materials. For use in the polyol blends of the present invention, the condensate should be prepared from at least one mol of alkylene oxide per mol of polyhydric alcohol.

The polyol blends useful in preparing fire-retardant, self-extinguishing polyurethane foams in accordance with the present invention preferably have a functionality equal to at least about 3. As used herein, the term functionality refers to the average number of hydroxyl groups per combined mol of diester and condensate in said blend. It has been found that, when blends having functionalities below about 3 are employed, the resulting foams often have poorer physical properties such as heat distortion temperatures and the like. It has also been found that, to produce self-extinguishing, fire-retardant foams, the amount of diester of tetrabromophthalic anhydride in the blend is preferably equal to from about 50% to about 60% by weight based on the total weight of said blend.

In preparing polyurethane foams, the polyol blend is combined with a catalyst, a surfactant, a blowing agent, and an isocyanate as described below.

The catalysts that may be used to accelerate the foam-forming reaction are those which have been conventionally employed in the preparation of polyurethane foams including, for example, amines and metal salts, the latter including both inorganic and organic salts. The catalyst may be either a single compound or a mixture of two or more compounds. Suitable catalysts which may be employed include, for example, N-alkyl morpholines, such as N-ethyl morpholine and N-methyl morpholine; stannous acylates, such as stannous acetate and stannous octoate; and dialkyl tin salts of carboxylic acids, such as dibutyl tin diacetate and dibutyl tin dilaurate.

Polyurethanes are used in both the unfoamed and the so-called foam form. In general, a foamed polyurethane is produced when low boiling liquids, gaseous blowing agents, or inflatants are incorporated into, or generated by, the polyurethane-forming reactants. Blowing agents which may be employed in the preparation of foamed polyurethanes in accordance with the present invention include, for example, water either alone or admixed with other compounds — e.g., as an aqueous solution of the catalyst. When water is employed, it reacts with an excess of the isocyanate to generate carbon dioxide thereby resulting in a foam. Other useful blowing agents include the chlorinated and fluorinated alkanes having from one to about three carbon atoms, such as the chlorofluoromethanes, the chlorofluorobutanes, and the chlorofluoroethanes. The amount of blowing agent employed can be varied over a wide range as is well known to those skilled in the art depending primarily upon the density desired in the foam product.

When blowing agents are included in or generated by the polyurethane reactants, there is also frequently included in the composition a stabilizer, the function of which is to control the amount and quality of the foamed polyurethane obtained. Without these stabilizers, or surfactants, the foams may either collapse or contain very large and irregular cells. Representative surfactants which may be employed include, for example, silicone compounds and silicone oil mixtures, such as siloxaneoxyalkylene block copolymers and the polyethylene glycol ethers of long chain alcohols. The amount of surfactant employed can be varied over a wide range, depending, for example, on the foam-forming composition employed and the properties desired in the foam product. For most applications, as is well known in the art, the surfactant is employed in an amount equal to from about 1.5 to about 2.5 parts by weight per 100 parts by weight of the polyol blend in the foam-forming composition.

The term "isocyanate" refers to those isocyanates which have previously been suggested for use in the preparation of polyurethane foams and includes both polyisocyanates and prepolymers of polyols and polyisocyanates wherein excess isocyanates (-NCO) groups are available to react with additional polyol. Organic isocyanates which may be employed include both aromatic and aliphatic isocyanates. As used herein, the term "aliphatic isocyanate" includes both aliphatic and alicyclic compounds as well as the aliphatic-like compounds — i.e., those which, although they contain an aromatic ring, react as an aliphatic compound, due primarily to the fact that the isocyanate group is not attached directly to the ring. Representative isocyanates which may be employed include, for example, PAPI, a crude polymeric polyisocyanate available from The Upjohn Company; Mondur MR, a polymethylene, polyphenyl polyisocyanate available from Mobay Chemical Company; and Rubinate M available from Rubicon Chemical Company. The amount of isocyanate employed depends on the number of hydroxyl groups present in the foam-forming composition. As is well known to those skilled in the art, the amount of isocyanate employed is frequently expressed by the term "index" which refers to the ratio of the actual amount of isocyanate in the composition to the theoretical amount of isocyanate required for reaction with all active hydrogen-containing compounds present in the foam-forming composition multiplied by 100. The amount of isocyanate used in generally in the range of an index of from about 90 to about 115.

The foam-forming compositions of the present invention may also include any of the additives which have heretofore been employed in the preparation of polyurethane foams and which do not adversely affect the desired properties of said foams. A preferred type of additive is a phosphorus-containing compound such as those which have been suggested for use in polyurethane foams. Representative phosphorus-containing compounds which may be employed include, for example, (a) a composition comprising about 68% by weight of the reaction product of 4 mols of propylene oxide and one mol of dibutyl phosphoric acid and about 32% by weight of dimethyl methyl phosphonate; and (b) phosphonates having the following general formula:

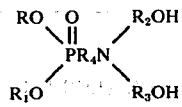

wherein R and $R_1$ are selected from the group consisting of alkyl, lower alkyl and lower haloalkyl radicals and $R_2$, $R_3$, and $R_4$ are lower alkylene radicals. As used herein, lower alkyl, lower haloalkyl, and lower alkylene refer to radicals containing less than about 4 carbon atoms.

In preparing the foams of the present invention, either the one-shot technique or a prepolymer procedure may be employed. In the one-shot method, all of the ingredients, that is, the polyol blend, the isocyanate, the blowing agent, the catalyst, and the surfactant, are simultaneously mixed with each other by any suitable means and then poured on to a surface where the foaming reaction takes place. In the prepolymer technique, on the other hand, part of the reaction involved in making the polyurethane foam is first carried out yielding a prepolymer of increased molecular weight with resultant end groups of either hydroxyls or isocyanates depending upon the stoichiometry used in making the prepolymer. This prepolymer is then used to prepare the desired final polyurethane foam by reacting it with either an isocyanate or a polyol, depending, as has been mentioned above, on whether the terminal groups of the prepolymer are hydroxyls or isocyanates.

A significant advantage of the foams produced from the diesters of the present invention is that they are fire retardant and self-extinguishing as defined above. These results are achieved in accordance with the present invention without any significant adverse effect on the other physical properties of the polyurethane foam.

The foams may be used, for example, as void fillers, board stock, sprayed coatings, and in any other application where polyurethane foams are conventionally employed and where improved fire retardancy and self-extinguishing properties are required.

In order to describe the present invention so that it may be more clearly understood, the following examples are set forth. These examples are set forth primarily for the purpose of illustration and any specific enumeration of detail contained therein should not be interpreted as a limitation on the concept of this invention.

In order to more conveniently describe the components of the foam-forming compositions utilized in the examples, the components are identified by their trademarks or a representative symbol. The trademarks or symbols used in the examples are identified as follows.

PAPI refers to an isocyanate available from The Upjohn Company.

TBPDG refers to the diglyceryl ester of tetrabromophthalic anhydride.

VC-611 refers to an organic phosphorus compound available from Mobil Chemical Company.

Fyrol 6 refers to diethyl N,N-bis(2-hydroxyethyl) aminomethyl phosphonate available from Stauffer Chemical Company.

L-5410 refers to a silicone surfactant available from Union Carbide Corporation.

Dabco R8020 refers to a catalyst from Houdry Process Company.

Freon R-11B refers to trichlorofluoromethane.

Polyol A refers to a material having a hydroxyl number of from 310 to 320 prepared by condensing propylene oxide and partially anhydrized sorbitol wherein 9.9 mols of propylene oxide are utilized per mol of partially anhydrized sorbitol.

In the foam-forming compositions in the examples, the amounts are expressed in parts by weight.

In evaluating the polyurethane foams, the following standard tests were employed.

The oxygen index of the foams was measured in accordance with A.S.T.M. D-2863-70.

The weight retention of the foams was determined in accordance with the Butler Chimney Test described in *J. Cellular Plastics*, Vol. 3, 497 (1967). The fire retardancy is expressed in terms of the percent of original weight retained by a sample and a higher value indicates a more fire-retardant foam.

EXAMPLE 1

Into a 500-ml., three-necked, round bottom flask equipped with a stirrer, nitrogen inlet tube, and condenser, there were added 184 grams of glycerin and 1.0 gram of sodium acetate. The mixture was heated to 130° C. and 464 grams of tetrabromophthalic anhydride were then added. The temperature of the reaction mixture was allowed to rise slowly to 190° C. and the reaction mixture was maintained at that temperature until the acid number reached less than one.

The final product was an amber solid having an acid number of 0.6, a percent bromine of 50, and a hydroxyl number of from 345 to 360. This compound favorably with the theoretical amounts which were calculated as a percent bromine of 50 and a hydroxyl number of 356.

EXAMPLE 2

Into a reaction flask as described in Example 1, there is added 1,420 grams of a 6-dendro sorbitol, the reaction product of 6 mols of ethylene oxide and one mol of sorbitol, and 5.0 grams of sodium acetate. The mixture is heated to 130° C. and there is then added 464 grams of tetrabromophthalic anhydride. After additional heating as in Example 1, there results a diester of tetrabromophthalic anhydride having a hydroxyl number of 301.

EXAMPLE 3

Into a reaction flask as described in Example 1, there is added 984 grams of 6-dendro bisphenol A, the reaction product of 6 mols of ethylene oxide and one mol of bisphenol A, and 0.5 gram of sodium acetate. The mixture is heated to 130° C. and there is then added 464 grams of tetrabromophthalic anhydride. The resulting reaction mixture is heated as in Example 1 at the end of which time there is recovered a diester derivative of tetrabromophthalic anhydride having a hydroxyl number of 784.

EXAMPLE 4

A polyol blend was prepared comprising:
50 grams of the diester prepared in Example 1,
3.7 grams of Polyol A, and
6.3 grams of VC-611.
A polyurethane foam-forming composition was prepared comprising:
46 grams of the polyol blend described above,
44 grams of PAPI,
0.5 gram of L-5410,
1.0 gram of Dabco R8020,
8.0 grams of Freon R-11B, and
0.5 gram of water.

A polyurethane foam prepared from the above composition had an oxygen index value of 26.6, a percent weight retention of 87–88, and a density of 2.3 pcf.

EXAMPLE 5

A foam-forming composition was prepared comprising:

| | |
|---|---|
| PAPI | 47.0 |
| TBPDG | 20.2 |
| 10-prodendro sorbitol | 17.7 |
| VC-611 | 2.5 |
| L-5410 | 0.5 |
| Dabco R8020 | 1.5 |
| Water | 0.5 |
| Freon R-11B | 10.0 |

Foam prepared from this composition had the following properties:

| | |
|---|---|
| Oxygen Index | 26.6 |
| Weight Retention (%) | 85.5 |

EXAMPLE 6

A foam-forming composition was prepared comprising:

| | |
|---|---|
| PAPI | 52.4 |
| TBPDG | 19.8 |
| 10-prodendro sorbitol | 16.1 |
| VC-611 | 3.7 |
| L-5410 | 0.5 |
| Dabco R8020 | 1.5 |
| Water | 1.0 |
| Freon R-11B | 5.0 |

Foam prepared from this composition had the following properties:

| | |
|---|---|
| Oxygen Index | 27.0 |
| Weight Retention (%) | 89.9 |

EXAMPLE 7

A foam-forming composition was prepared comprising:

| | |
|---|---|
| PAPI | 47.9 |
| TBPDG | 19.8 |
| Polyol A | 16.5 |
| Fyrol 6 | 3.2 |
| L-5410 | 0.5 |
| Dabco R8020 | 1.5 |
| Water | 0.5 |
| Freon R-11B | 10.0 |

Foam prepared from this composition had the following properties:

| | |
|---|---|
| Oxygen Index | 26.6 |
| Weight Retention (%) | 88.7 |

EXAMPLE 8

A foam-forming composition was prepared comprising:

| | |
|---|---|
| PAPI | 40.2 |
| TBPDG | 20.5 |
| Polyol A | 20.5 |
| Phosgard C22R | 6.7 |
| L5410 | 0.5 |
| Dabco R8020 | 1.5 |
| Water | 0.5 |
| Freon R-11B | 10.0 |

Foam prepared from this composition had the following physical properties:

| | |
|---|---|
| Oxygen Index | 28.6 |
| Weight Retention (%) | 86.0 |

What is claimed is:
1. A polyol blend comprising a simple diester of tetrabromophthalic anhydride and a polyhydric alcohol selected from the group consisting of trimethylol pro- pane, pentaerythritol, glycerol, the reaction product of propylene oxide and sorbitol, the reaction product of ethylene oxide and sorbitol, arabitol, xylitol, adonitol, mannitol, dulcitol, sorbitol, 1,2,4-benzenetriol, phloroglucinol, 1,2,3,5-benzenetetrol, 1,2,4,5-benzenetetrol, and benzenehexol, wherein the molar ratio of polyhydric alcohol to tetrabromophthalic anhydride is equal to 2 to 1, and a condensate prepared by reacting an alkylene oxide with a polyhydric alcohol.

2. A polyol blend, as claimed in claim 1, wherein the functionality of said blend is equal to at least about 3.

3. A polyol blend, as claimed in claim 1, wherein the amount of the simple diester is equal to from about 50% to about 60% by weight based on the total weight of said blend.

4. A polyurethane foam-forming composition comprising:
   a. a polyol blend as claimed in claim 1,
   b. an isocyanate,
   c. a catalyst,
   d. a blowing agent, and
   e. a surfactant.

5. A foam-forming composition, as claimed in claim 4, further including an organic phosphorus-containing compound.

6. A composition, as claimed in claim 5, wherein the phosphorus-containing compound is a composition comprising about 86% by weight of the reaction product of 4 mols of propylene oxide and one mol of dibutyl phosphoric acid and about 32% by weight of dimethyl methyl phosphonate.

7. A composition, as claimed in claim 5, wherein the phosphorus-containing compound is a phosphonate having the following formula:

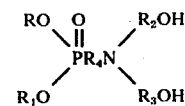

wherein R and $R_1$ are selected from the group consisting of allyl, lower alkyl, and lower haloalkyl radicals and $R_2$, $R_3$, and $R_4$ are lower alkylene radicals.

8. A fire-retardant, self-extinguishing, polyurethane foam comprising the reaction product of
   a. a polyol blend as claimed in claim 1, and
   b. an isocyanate.

UNITED STATES PATENT AND TRADEMARK OFFICE
CERTIFICATE OF CORRECTION

PATENT NO. : 3,989,653
DATED : November 2, 1976
INVENTOR(S) : James P. Baldino and Joseph Feltzin It is certified that error appears in the above-identified patent and that said Letters Patent are hereby corrected as shown below:

Column 5, line 23, "in" first occurrence, should read -- is --.
Column 5, line 48, "alkyl," first occurrence, should read -- allyl, --.
Column 7, line 3, "compound" should read -- compared --.

Signed and Sealed this

Tenth Day of April 1979

[SEAL]

Attest:

RUTH C. MASON
*Attesting Officer*

DONALD W. BANNER
*Commissioner of Patents and Trademarks*